H. F. SCHRODER.
JOURNAL BEARING MOLD.
APPLICATION FILED JULY 3, 1909.

974,530.

Patented Nov. 1, 1910.
5 SHEETS—SHEET 1.

Witnesses:
Wm. Geiger
N. W. Munday

Inventor:
Herman F. Schroder
By Munday, Evarts, Adcock & Clarke
Attorneys

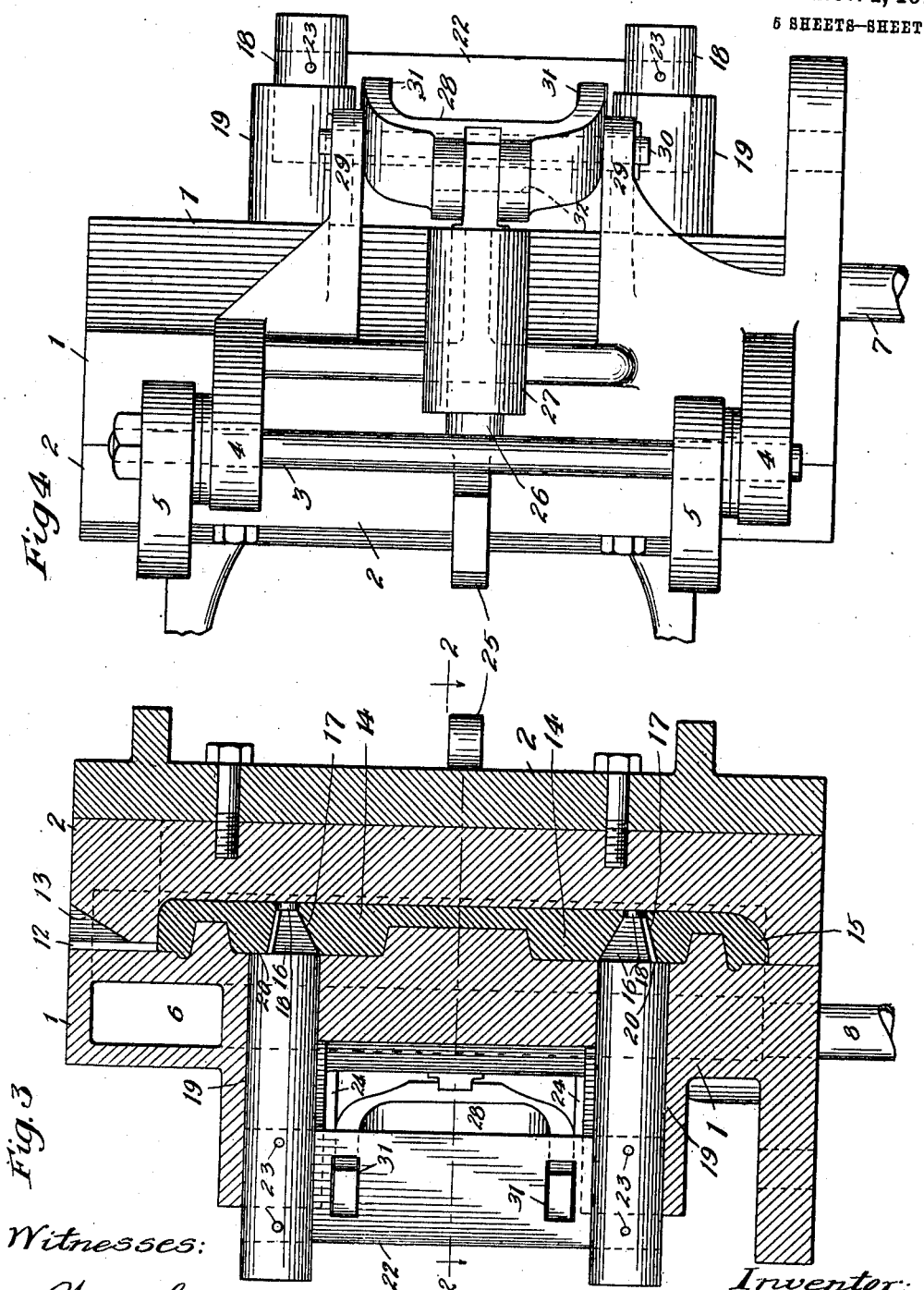

H. F. SCHRODER.
JOURNAL BEARING MOLD.
APPLICATION FILED JULY 3, 1909.
974,530.
Patented Nov. 1, 1910.
5 SHEETS—SHEET 3.
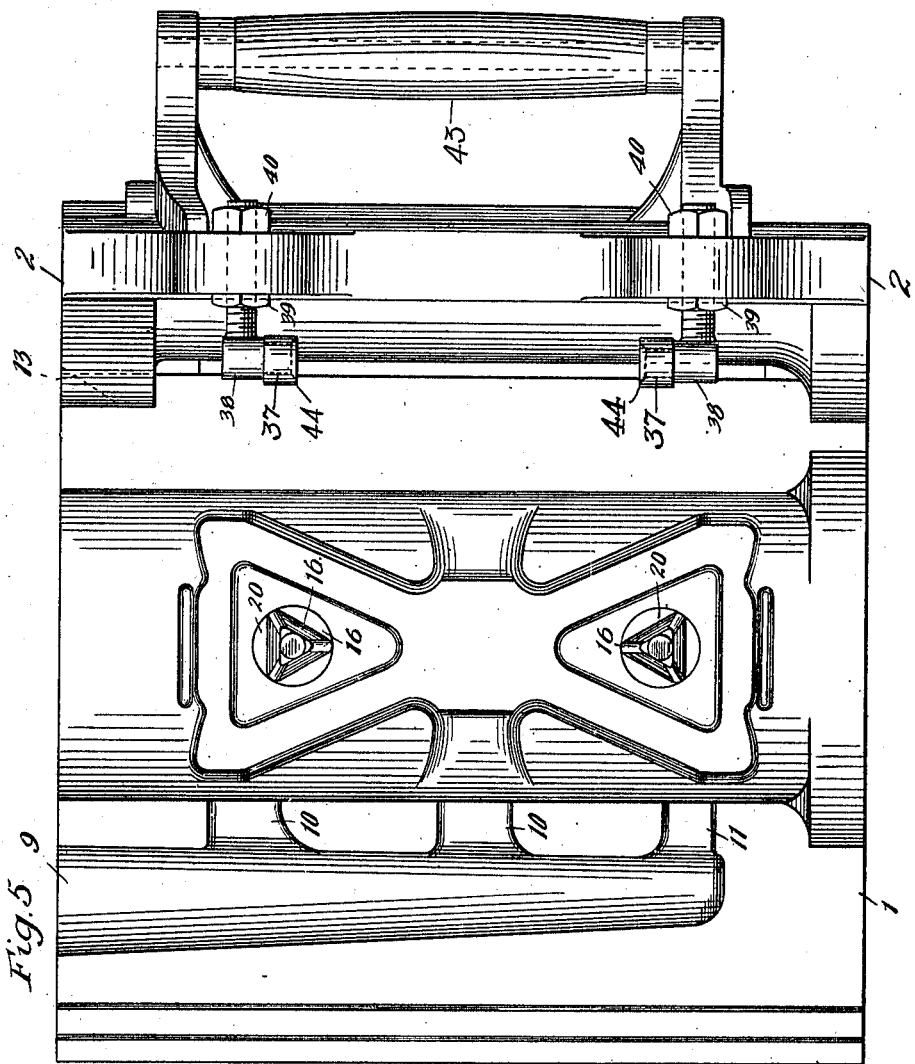
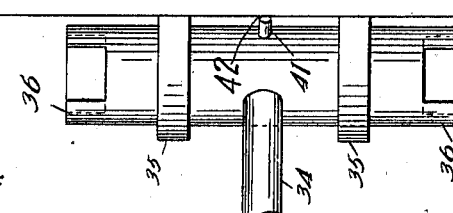

H. F. SCHRODER.
JOURNAL BEARING MOLD.
APPLICATION FILED JULY 3, 1909.

974,530.

Patented Nov. 1, 1910.
5 SHEETS—SHEET 4.

Witnesses
Wm. Geiger
H. W. Munday

Inventor
Herman F. Schroder.
By Munday, Evarts, Adcock & Clark.
Attorneys

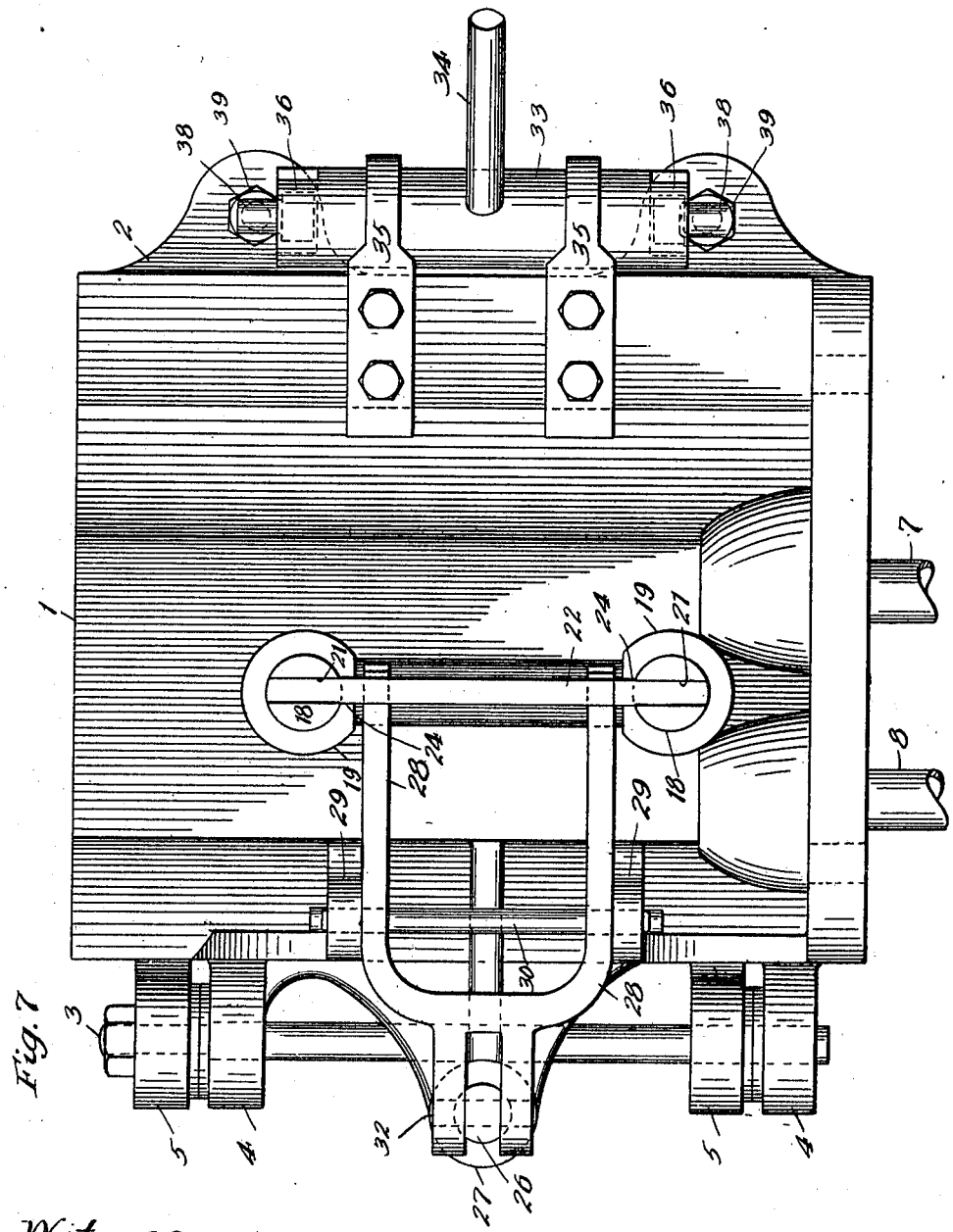

UNITED STATES PATENT OFFICE.

HERMAN F. SCHRODER, OF BERWYN, ILLINOIS, ASSIGNOR TO WILLIAM H. MINER, OF CHICAGO, ILLINOIS.

JOURNAL-BEARING MOLD.

974,530. Specification of Letters Patent. Patented Nov. 1, 1910.

Application filed July 3, 1909. Serial No. 505,839.

*To all whom it may concern:*

Be it known that I, HERMAN F. SCHRODER, a citizen of the United States, residing in Berwyn, in the county of Cook and State of Illinois, have invented a new and useful Improvement in Journal-Bearing Molds, of which the following is a specification.

My invention relates to improvements in molds for manufacturing soft bearing-metal liners or shells for journal bearings for cars and other axles.

The object of my invention is to provide a journal bearing mold suitable for manufacturing the soft bearing metal shells or liners of the journal bearing forming the subject of my pending application, Serial No. 474,070, filed Jan. 25, 1909, or of the Muhlfeld Patent No. 904,634, and by means of which such soft metal bearing shells or liners may be rapidly and cheaply cast and readily removed from the mold without injury thereto.

My invention consists in combination with the opening and closing members of the mold, preferably hinged together and comprising a main or stationary member and a hinged or door member and movable core members for forming the tapering lubricant cavities in the liner or bearing shell cast therein, of connecting means between the hinged member or door of the mold and the movable core members thereof to automatically operate the movable core members to eject the soft metal bearing shell or liner from the mold by the opening of the door.

It further consists in connection with the main and door members of the mold, of a rocking lock shaft on one of the members furnished with eccentric slotted locking rims and coöperating adjustable locking rollers on the other member adapted to enter and engage the slotted locking rims of the rock shaft on the first member to enable the two members of the mold to be snugly, firmly and securely locked together and readily opened and closed.

It further consists in the novel construction of parts and devices and in the novel combinations of parts and devices herein shown and described.

Figure 1:
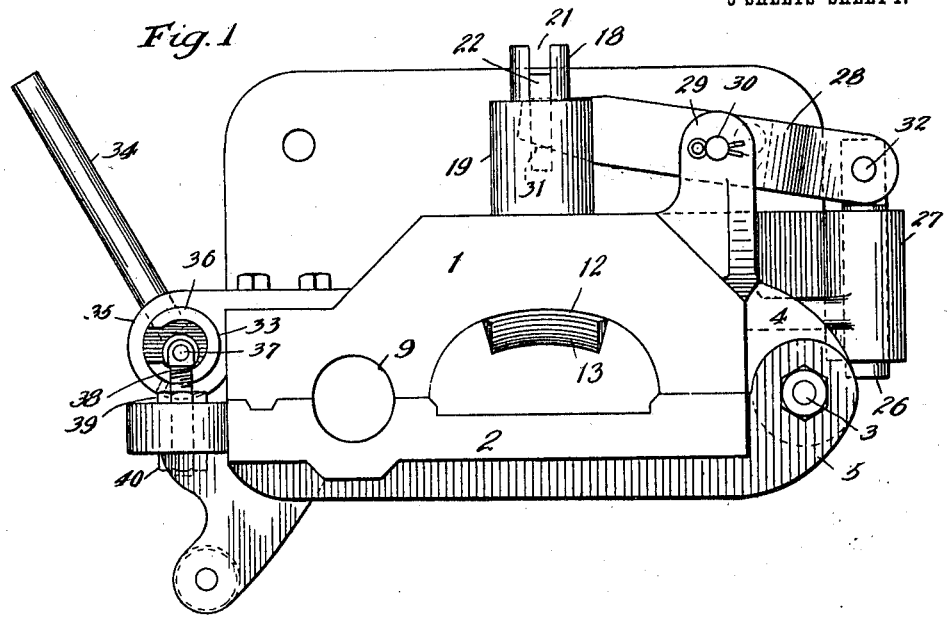
Figure 2:
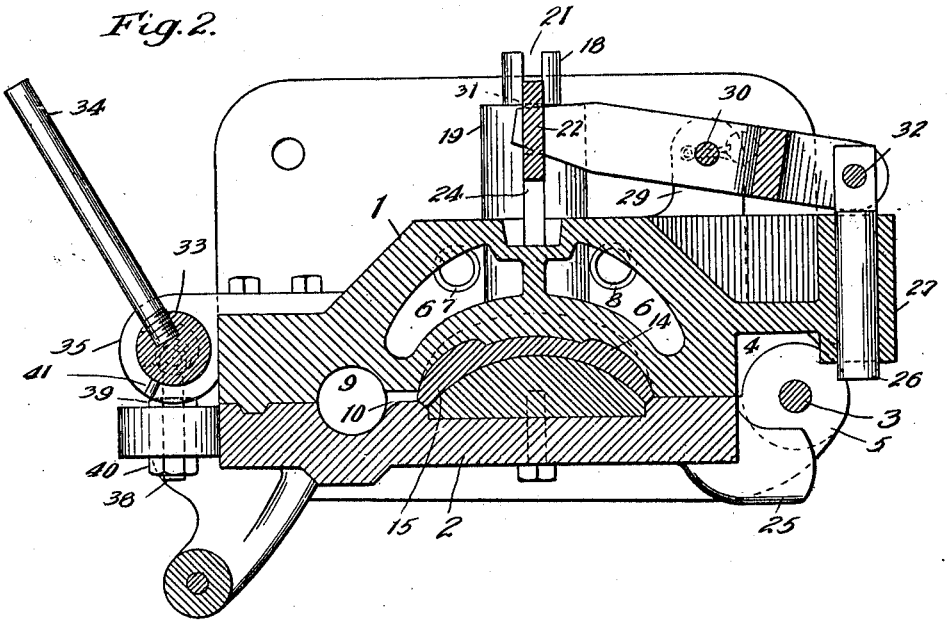
Figure 6:
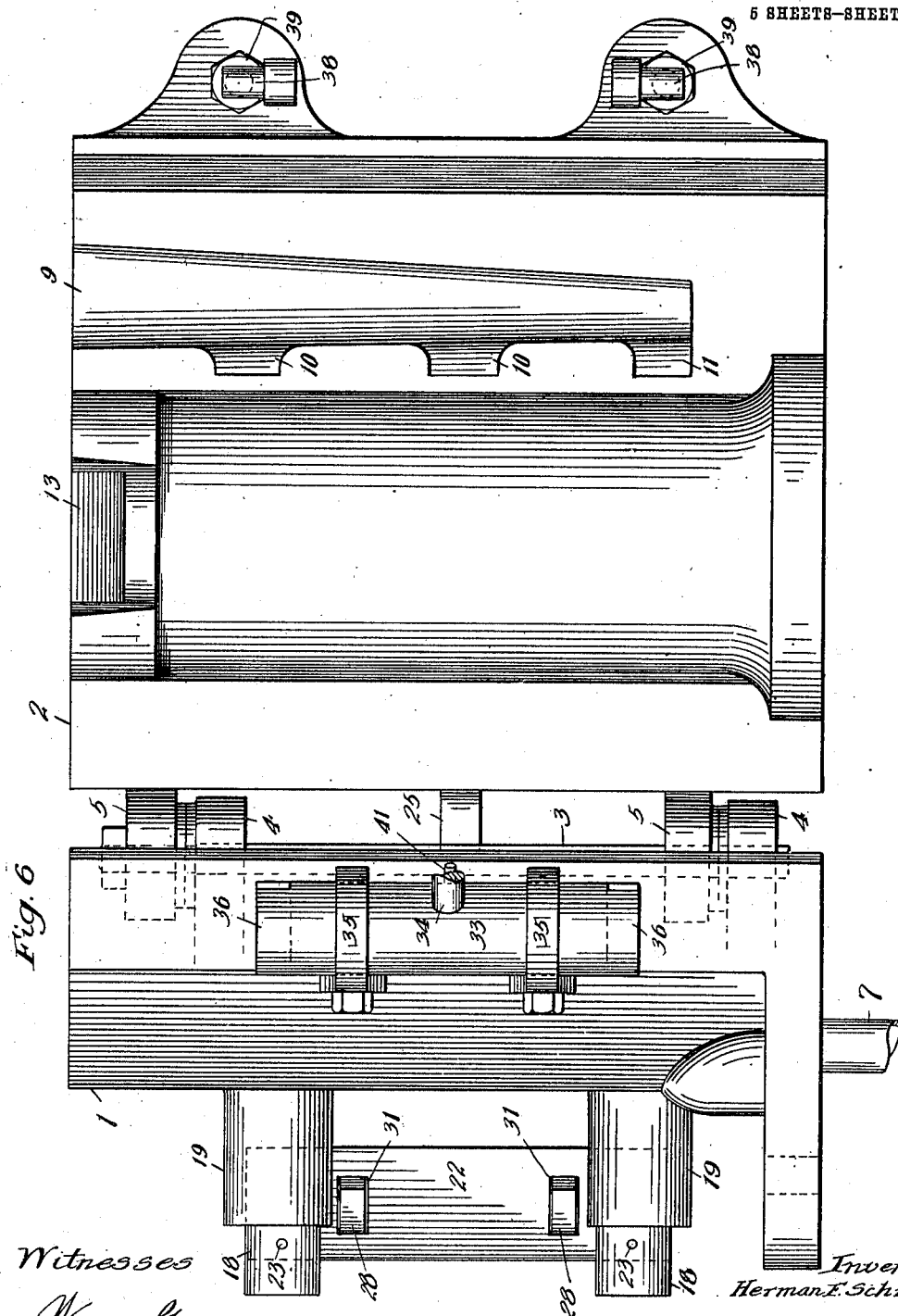

In the accompanying drawing forming a part of this specification, Figure 1 is a plan view of a journal bearing mold embodying my invention. Fig. 2 is a horizontal section on line 2—2 of Fig. 3, showing certain parts in elevation, and the locking devices on the main and door members of the mold in position for opening the mold. Fig. 3 is a central, vertical longitudinal section. Fig. 4 is a side elevation. Fig. 5 is a front elevation showing the door of the mold open. Fig. 6 is a side elevation showing the mold with the door open and Fig. 7 is a rear elevation.

In the drawing, 1 is the main or stationary member of the mold and 2 the door or hinged member thereof, the two members being hinged together by a pin 3 extending through suitable ears or lugs 4, 5 on the two members of the mold. The movable or door member 2 is provided with a handle 43 for swinging it horizontally open and closed.

The main or stationary member 1 of the mold is preferably water jacketed or provided with a water chamber 6 connecting with the inlet and outlet pipes 7, 8 through which water may circulate to cool the mold and facilitate the casting operation.

The mold members 1, 2 are furnished with an upright gate 9 having a plurality of runners 10, 10, 11 at different heights communicating with the interior of the mold, the upper two of which, 10, 10, are preferably upwardly inclined or deflected to give the inflowing molten metal a somewhat upward deflection or direction, as this I find aids in producing solid, perfect and homogeneous liners or castings. The vent 12 at the upper end of the mold is preferably formed in the door or hinged member 2 at its meeting face with the main member and provided with the customary telltale or enlargement 13.

The member of the mold which forms the ribs or thickened portions 14 on the upper face of the soft metal liner or bearing shell 15 is preferably the main or stationary member 1, and it is provided with movable core members 16 which form the flaring lubricant cavities 17 in the soft metal bearing shell or liner 15. The movable core members 16 are pointed or tapering in shape and each have a round cylindrical stem or shank 18 adapted to slide in and project through suitable sockets 19 in the mold member 1. The shank or stem 18 is preferably larger than the core member 16 at the base or outer end thereof to form shoulders 20 which serve to give a more extended bearing or engagement against the soft metal liner 15 when the core member is reciprocated to eject the liner or casting from the mold. The stems or shanks of the core members are furnished with slots 21 to receive a connecting bar 22 to which the same are connected by pins 23, the core sockets 19 on the main mold member 1 being also furnished with slots 24 to accommodate said connecting bar. The movable cores which also serve as ejectors to force the soft metal liner 15 or the casting formed in the mold out of the same, are simultaneously and automatically operated through and by the door or hinge member of the mold as it is swung open through suitable connecting mechanism, consisting preferably of a lug or arm 25 on the door or hinge member 2 of the mold near the hinge axis thereof which engages a piston or pin 26 mounted in a suitable bearing 27 on the main member of the mold and connected to or engaging a forked lever 28 pivoted to suitable lugs 29 on the main member of the mold by a pin 30, and which forked lever fits in suitable slots or openings 31 in the upright connecting bar 22 of the core members or ejector devices 16. The piston 26 is preferably connected to the fork end of the lever by a pin 32. The movable cores 16 are restored to position by engagement with the door of the mold when it is again closed.

The two members of the mold are securely locked in their closed position by means of a rocking lock shaft 33 having a lever 34 for turning it and mounted in suitable bearings 35 on the main or stationary mold member 1, and provided at its upper and lower ends with eccentric locking rims 36 having lateral or radial slots therein to receive the coöperating locking rollers 44 on the door member of the mold, and which are journaled upon upright pins 37 and adjustably secured by right angle screw threaded stems or bolts 38, preferably integral with the roller pins, to the door member; the locking rollers being accurately adjustable in position by nuts 39, 40 on the stems or bolts 38.
The rocking lock shaft and the mold member upon which it is mounted are preferably furnished with stops 41, 42 to limit its turning movement, and thus insure proper registry of the slots in its locking rims with the locking rollers on the door preparatory to swinging the door open or shut. The stop 41 is preferably a pin or projection on the rocking lock shaft 33, and the coöperating stop 42 may preferably be the adjacent upright face of the mold member 1 which is adapted to engage the stop 41 from the shaft 33, and thus limit its turning movement, as will be readily understood from Fig. 2 of the drawing. The main and door members of the mold are preferably furnished with an interfitting rib and groove at their front ends to insure tight closure.

While my journal bearing mold is specially intended and designed for making soft metal liners or shells for journal bearings, it may of course be used for making other articles.

I claim:

1. In a mold for manufacturing journal bearing liners, the combination with a main mold member, of a door mold member hinged thereto, a pair of movable cores mounted to reciprocate in one of said mold members and eject the soft metal liner cast therein therefrom, and connecting means for operating said cores simultaneously from and by the door member by its opening movement, substantially as specified.

2. In a mold for making journal bearing liners, the combination with a stationary main member, of a door member hinged thereto, a pair of movable cores mounted to reciprocate through the main member and eject the soft metal liner cast therein therefrom, a bar connecting said movable cores, an operating lever therefor, said door member having an arm actuating said lever when the door is swung open, substantially as specified.

3. A mold for manufacturing journal bearing liners, comprising a main member, a door member, and movable cores mounted to reciprocate through said main member and eject the soft metal liner cast therein therefrom, a lever for operating said movable cores, the door having an arm for actuating said lever when it is thrown open, substantially as specified.

4. A mold for manufacturing journal bearing liners, comprising a main member, a door member, and movable cores mounted to reciprocate through said main member and eject the soft metal liner cast therein therefrom, a lever for operating said movable cores, the door having an arm for actuating said lever when it is thrown open, and a piston interposed between said operating lever and said arm of the door, substantially as specified.

5. A mold for manufacturing journal bearing liners, comprising a main member, a door member, and movable cores mounted to reciprocate through said main member and eject the soft metal liner cast therein therefrom, a lever for operating said movable cores, the door having an arm for actuating said lever when it is thrown open, and a piston interposed between said operating lever and said arm of the door, said operating lever having a fork and said cores having a bar connecting the same and engaging the fork of the lever, substantially as specified.

6. A mold comprising a stationary main member and a door member hinged thereto, an ejector to force the casting out of the mold, and means for operating said ejector from and by the door as it is swung open, said means including an operating lever and an arm on the door actuating said lever, substantially as specified.

7. A mold comprising a stationary main member and a door member hinged thereto, an ejector to force the casting out of the mold, and means for operating said ejector from and by the door as it is swung open, said means including an operating lever and an arm on the door actuating said lever, and a piston interposed between said arm and lever, substantially as specified.

8. A mold comprising a stationary main member and a door member hinged thereto, a plurality of ejectors to force the casting out of the mold, and means for simultaneously operating said ejectors from and by the door as it is swung open, substantially as specified.

9. A mold comprising a stationary main member and a door member hinged thereto, a plurality of ejectors to force the casting out of the mold, and means for operating said ejectors from and by the door as it is swung open, said means including a connecting bar between said ejectors, an operating lever and an arm on the door for actuating said lever, substantially as specified.

10. A mold comprising a stationary main member and a door member hinged thereto, a plurality of ejectors to force the casting out of the mold, and means for operating said ejectors from and by the door as it is swung open, said means including a connecting bar between said ejectors, an operating lever and an arm on the door for actuating said lever, and a piston interposed between said lever and said arm, substantially as specified.

11. A mold for making soft metal journal bearing liners comprising a stationary main member, a door member hinged thereto, a rocking lock shaft on one of said members provided at its opposite ends with slotted eccentric rims and a pair of locking rollers on the other member of the mold adapted to enter and engage said slotted rims of the rock shaft, substantially as specified.

12. A mold comprising a stationary main member and a door member hinged thereto, one of said members having a rock shaft furnished with an eccentric slotted locking rim, and the other of said members having a locking roller adapted to enter and engage said slotted locking rim of said rock shaft, substantially as specified.

13. A mold comprising a main member and a door member hinged thereto, the main member having a locking ring furnished with a slot, and the door member having a locking pin adapted to enter said slot and engage said ring, substantially as specified.

14. A mold for making soft metal journal bearing liners comprising a stationary main member, a door member hinged thereto, a rocking lock shaft on one of said members provided at its opposite ends with slotted eccentric rims and a pair of locking rollers on the other member of the mold adapted to enter and engage said slotted rims of the rock shaft, said rock shaft and the mold member upon which it is mounted having interengaging stops, substantially as specified.

15. A mold comprising a stationary main member and a door member hinged thereto, one of said members having a rock shaft furnished with an eccentric slotted locking rim, and the other of said members having a locking roller adapted to enter and engage said slotted locking rim of said rock shaft, said rock shaft and the mold member upon which it is mounted having interengaging stops, substantially as specified.

16. A mold for making soft metal journal bearing liners comprising a stationary main member, a door member hinged thereto, a rocking lock shaft on one of said members provided at its opposite ends with slotted eccentric rims and a pair of locking rollers on the other member of the mold adapted to enter and engage said slotted rims of the rock shaft, and means for adjusting said locking rollers in respect to said locking rims, substantially as specified.

17. A mold comprising a main member and a door member hinged thereto, the main member having a locking ring furnished with a slot, and the door member having a locking pin adapted to enter said slot and engage said ring, and means for adjusting the position of said locking pin in respect to said locking ring, substantially as specified.

Chicago, Illinois, July 1st, 1909.

HERMAN F. SCHRODER.

Witnesses:
H. M. MUNDAY,
PEARL ABRAMS.